US012710995B2

(12) United States Patent
Tang

(10) Patent No.: US 12,710,995 B2
(45) Date of Patent: Aug. 18, 2026

(54) CLOUD RESOURCE MANAGEMENT METHOD AND APPARATUS, COMPUTER DEVICE, AND STORAGE MEDIUM

(71) Applicant: Huawei Cloud Computing Technologies Co., Ltd., Guizhou (CN)

(72) Inventor: Jianhua Tang, Hangzhou (CN)

(73) Assignee: HUAWEI CLOUD COMPUTING TECHNOLGOIES CO., LTD., Guizhou (CN)

( * ) Notice: Subject to any disclaimer, the term of this patent is extended or adjusted under 35 U.S.C. 154(b) by 666 days.

(21) Appl. No.: 18/192,149

(22) Filed: Mar. 29, 2023

(65) Prior Publication Data

US 2023/0244541 A1 Aug. 3, 2023

Related U.S. Application Data

(63) Continuation of application No. PCT/CN2021/120829, filed on Sep. 27, 2021.

(30) Foreign Application Priority Data

Sep. 30, 2020 (CN) ........................ 202011062773.4

(51) Int. Cl.
*G06F 16/00* (2019.01)
*G06F 9/50* (2006.01)
*G06F 16/29* (2019.01)

(52) U.S. Cl.
CPC .......... *G06F 9/5072* (2013.01); *G06F 9/5077* (2013.01); *G06F 16/29* (2019.01)

(58) Field of Classification Search
CPC ....... G06F 9/5072; G06F 9/5077; G06F 16/29
See application file for complete search history.

(56) References Cited

U.S. PATENT DOCUMENTS

| | | | | |
|---|---|---|---|---|
| 2013/0304925 | A1 | 11/2013 | Ferris et al. | |
| 2015/0067171 | A1 | 3/2015 | Yum et al. | |
| 2020/0379816 | A1* | 12/2020 | Lin ....................... | G06F 9/5077 |
| 2021/0263887 | A1* | 8/2021 | Malecki ................ | G06F 16/122 |

FOREIGN PATENT DOCUMENTS

| | | | | |
|---|---|---|---|---|
| CN | 103746823 | A | * | 4/2014 |
| CN | 111475728 | A | | 7/2020 |

OTHER PUBLICATIONS

Sverdlik,"TeleGeography Maps the World's Cloud Data Centers",Aug. 2020,internet download, pp. 1-4 (Year: 2020).*
www.datacentermap.com,Wayback Machine Internet Archive Download,Aug. 2020,pp. 1-2 (Year: 2020).*

* cited by examiner

*Primary Examiner* — Alexander Khong
(74) *Attorney, Agent, or Firm* — Conley Rose, P.C.

(57) ABSTRACT

A cloud resource management method pertains to the field of cloud service technologies. The cloud resource management method includes providing an interaction interface, where the interaction interface receives a cloud resource query instruction from a tenant, and the cloud resource query instruction requests to query a cloud resource managed by a cloud management platform; and sending, to the tenant according to the cloud resource query instruction, a cloud resource map marked with a geographical location of the cloud resource to enrich functions of managing the cloud resource by the cloud management platform.

20 Claims, 9 Drawing Sheets

CLOUD RESOURCE MANAGEMENT METHOD AND APPARATUS, COMPUTER DEVICE, AND STORAGE MEDIUM

CROSS-REFERENCE TO RELATED APPLICATIONS

This is a continuation of International Patent Application No. PCT/CN2021/120829 filed on Sep. 27, 2021, which claims priority to Chinese Patent Application No. 202011062773.4 filed on Sep. 30, 2020, which is hereby incorporated by reference in its entirety.

TECHNICAL FIELD

This disclosure relates to the field of cloud service technologies, and in particular, to a cloud resource management method and apparatus, a computer device, and a storage medium.

BACKGROUND

With rapid development of cloud service technologies, it has become a trend to use cloud resources deployed on the cloud to implement services. For example, when an application runs on a terminal, an interface of the application that needs to be displayed by the terminal based on an operation performed by a tenant on the terminal is rendered using a cloud resource.

However, a cloud management platform manages cloud resources in a single manner.

SUMMARY

This disclosure provides a cloud resource management method and apparatus, a computer device, and a storage medium, to enrich functions of managing a cloud resource by a cloud management platform.

According to a first aspect, this disclosure provides a cloud resource management method. The cloud resource management method is applied to a cloud management platform. The cloud resource management method includes providing an interaction interface, where the interaction interface is used to receive a cloud resource query instruction from a tenant, and the cloud resource query instruction is used to request to query a cloud resource managed by the cloud management platform, and sending, to the tenant according to the cloud resource query instruction, a cloud resource map marked with a geographical location of the cloud resource.

In the cloud resource management method, the cloud management platform provides the interaction interface, such that the cloud management platform can receive the cloud resource query instruction from the tenant through the interaction interface, and send, to the tenant according to the cloud resource query instruction, the cloud resource map marked with the geographical location of the cloud resource. This function of the cloud management platform enables a terminal used by the tenant to display the cloud resource map, and present the geographical location of the cloud resource to the tenant, to enrich functions of managing the cloud resource by the cloud management platform.

In a possible implementation, the cloud resource query instruction carries tenant information, and the cloud resource includes a cloud resource that has been purchased and/or concerned by a tenant corresponding to the tenant information.

In another possible implementation, the cloud resource query instruction carries a cloud resource identifier, and the cloud resource includes a cloud resource indicated by the cloud resource identifier.

In still another possible implementation, the cloud resource query instruction carries a type identifier, and the cloud resource includes a cloud resource of a type indicated by the type identifier.

Optionally, the cloud resource map is further used to indicate related information of any cloud resource displayed in the cloud resource map, and the related information includes one or more of the following: a type of the cloud resource, a real-time running status of the cloud resource, a predicted running status of the cloud resource, a geographical location of a physical resource on which the cloud resource depends, an environment status of an environment in which the physical resource on which the cloud resource depends is located, a deployment condition of the cloud resource, fee information of the cloud resource, and version information of the cloud resource.

In an implementation, the interaction interface is further used to receive a selection instruction from the tenant, and the selection instruction is used to request to query a cloud resource selected using the selection instruction. For example, when the tenant views the cloud resource map on the terminal, the tenant may select any cloud resource managed by the cloud management platform, to indicate that related information of the cloud resource needs to be learned of. The selection operation triggers the selection instruction in the terminal. In this case, the terminal may make a response according to the selection instruction. The selection instruction indicates to query the related information of the selected cloud resource. Correspondingly, after sending, to the tenant according to the cloud resource query instruction, a cloud resource map marked with a geographical location of the cloud resource, the cloud resource management method further includes sending, to the tenant, the related information of the cloud resource selected using the selection instruction, where the related information includes one or more of the following: a type of the cloud resource, a real-time running status of the cloud resource, a predicted running status of the cloud resource, a geographical location of a physical resource on which the cloud resource depends, an environment status of an environment in which the physical resource on which the cloud resource depends is located, a deployment condition of the cloud resource, fee information of the cloud resource, and version information of the cloud resource.

Optionally, the selection operation may be performed by the tenant to trigger the selection operation in many implementations. For example, the selection operation may be searching a search box in an interface in which the cloud resource map is displayed for a cloud resource, or may be clicking a cloud resource using a mouse, or may be moving an input cursor to a display location of a cloud resource.

Because the cloud management platform is configured to manage a cloud resource for implementing a service of the tenant, the cloud resource management method further includes sending, to the tenant, an operation and maintenance notification of the cloud resource purchased by the tenant, where a function of the operation and maintenance notification includes one or more of the following: indicating a running status of the cloud resource purchased by the tenant, recommending a matching resource of the cloud resource purchased by the tenant, and reminding the tenant of fee information of the cloud resource purchased by the tenant.

Optionally, in addition to sending the operation and maintenance notification to a terminal associated with the cloud resource, the cloud management platform may further send other information to the terminal associated with the cloud resource. In a possible implementation, the cloud resource management method further includes sending, to the tenant, one or more improvement policies used to improve the running status of the cloud resource purchased by the tenant, receiving a feedback instruction sent by the tenant, where the feedback instruction is used to indicate an improvement policy selected from the one or more improvement policies, and executing, on the cloud resource purchased by the tenant, the improvement policy selected using the feedback instruction.

After the cloud management platform determines that the tenant purchases a cloud resource, the cloud management platform recommends an improvement policy to the tenant according to a resource policy of the cloud management platform, where the improvement policy is used to improve the running status of the cloud resource purchased by the tenant. In a possible implementation, the improvement policy may include: a policy for indicating to adjust a bandwidth used by the cloud resource, a policy for indicating to migrate a virtual resource used by the tenant, a policy for indicating to switch a type of the cloud resource, a policy for indicating to restart, rebind, and re-establish a connection to the cloud resource, a policy for indicating to expand a capacity of a cloud disk of the cloud resource or newly add a cloud disk, a policy for prompting to update software of the cloud resource, and the like. In addition, after the cloud management platform receives the feedback instruction, when the feedback instruction indicates to execute one of the one or more improvement policies on the cloud resource, the cloud management platform may execute, on the cloud resource, the improvement policy indicated by the feedback instruction, to optimize performance of a running status of the cloud resource.

In a possible implementation, the interaction interface includes one or more of the following: an application programming interface (API), an interaction template, and a configuration interface.

According to a second aspect, this disclosure provides a cloud resource management method, applied to a terminal. The cloud resource management method includes sending a cloud resource query instruction to a cloud management platform through an interaction interface in the cloud management platform, where the cloud resource query instruction is used to request to query a cloud resource managed by the cloud management platform, receiving a cloud resource map that is sent by the cloud management platform and that is marked with a geographical location of the cloud resource, and displaying the cloud resource map.

In the cloud resource management method, the terminal sends the cloud resource query instruction to the cloud management platform through the interaction interface in the cloud management platform, receives the cloud resource map that is sent by the cloud management platform and that is marked with the geographical location of the cloud resource, and displays the cloud resource map, such that the cloud resource map can be displayed on the terminal, and the geographical location of the cloud resource can be presented to a tenant, to enrich presentation manners of the cloud resource.

In a possible implementation, the cloud resource query instruction carries tenant information, and the cloud resource includes a cloud resource that has been purchased and/or concerned by a tenant corresponding to the tenant information.

In another possible implementation, the cloud resource query instruction carries a cloud resource identifier, and the cloud resource includes a cloud resource indicated by the cloud resource identifier.

In still another possible implementation, the cloud resource query instruction carries a type identifier, and the cloud resource includes a cloud resource of a type indicated by the type identifier.

Optionally, the cloud resource map is further used to indicate related information of any cloud resource displayed in the cloud resource map, and the related information includes one or more of the following: a type of the cloud resource, a real-time running status of the cloud resource, a predicted running status of the cloud resource, a geographical location of a physical resource on which the cloud resource depends, an environment status of an environment in which the physical resource on which the cloud resource depends is located, a deployment condition of the cloud resource, fee information of the cloud resource, and version information of the cloud resource.

Optionally, after displaying the cloud resource map, the cloud resource management method further includes receiving a selection operation that is entered by a tenant and that is performed on any cloud resource in the cloud resource map, sending a selection instruction to the cloud management platform based on the selection operation, receiving related information that is of the any cloud resource and that is sent by the cloud management platform, and displaying the related information of the any cloud resource, where the related information includes one or more of the following: a type of the cloud resource, a real-time running status of the cloud resource, a predicted running status of the cloud resource, a geographical location of a physical resource on which the cloud resource depends, an environment status of an environment in which the physical resource on which the cloud resource depends is located, a deployment condition of the cloud resource, fee information of the cloud resource, and version information of the cloud resource.

Optionally, the cloud resource management method further includes receiving an operation and maintenance notification that is of the cloud resource and that is sent by the cloud management platform, where a function of the operation and maintenance notification includes one or more of the following: indicating a running status of the cloud resource, recommending a matching resource of the cloud resource, and reminding the tenant of tariff information of the cloud resource, and displaying the operation and maintenance notification.

Optionally, the cloud resource management method further includes receiving one or more improvement policies that are sent by the cloud management platform and that are used to improve the running status of the cloud resource, displaying the one or more improvement policies, receiving a feedback operation performed by the tenant on the one or more improvement policies, and sending a feedback instruction to the cloud management platform based on the feedback operation, where the feedback instruction is used to indicate an improvement policy selected from the one or more improvement policies.

According to a third aspect, this disclosure provides a cloud resource management apparatus. The cloud resource management apparatus includes a receiving module configured to provide an interaction interface, where the interaction interface is used to receive a cloud resource query instruction from a tenant, and the cloud resource query instruction is used to request to query a cloud resource managed by the cloud resource management apparatus, and a sending module configured to send, to the tenant according to the cloud resource query instruction, a cloud resource map marked with a geographical location of the cloud resource.

Optionally, the cloud resource query instruction carries tenant information, and the cloud resource includes a cloud resource that has been purchased and/or concerned by a tenant corresponding to the tenant information.

Optionally, the cloud resource query instruction carries a cloud resource identifier, and the cloud resource includes a cloud resource indicated by the cloud resource identifier.

Optionally, the cloud resource query instruction carries a type identifier, and the cloud resource includes a cloud resource of a type indicated by the type identifier.

Optionally, the cloud resource map is further used to indicate related information of any cloud resource displayed in the cloud resource map, and the related information includes one or more of the following: a type of the cloud resource, a real-time running status of the cloud resource, a predicted running status of the cloud resource, a geographical location of a physical resource on which the cloud resource depends, an environment status of an environment in which the physical resource on which the cloud resource depends is located, a deployment condition of the cloud resource, fee information of the cloud resource, and version information of the cloud resource.

Optionally, the interaction interface is further used to receive a selection instruction from the tenant, and the selection instruction is used to request to query a cloud resource selected using the selection instruction. In this case, the sending module is further configured to send, to the tenant, related information of the cloud resource selected using the selection instruction, where the related information includes one or more of the following: a type of the cloud resource, a real-time running status of the cloud resource, a predicted running status of the cloud resource, a geographical location of a physical resource on which the cloud resource depends, an environment status of an environment in which the physical resource on which the cloud resource depends is located, a deployment condition of the cloud resource, fee information of the cloud resource, and version information of the cloud resource.

Optionally, the sending module is further configured to send, to the tenant, an operation and maintenance notification of the cloud resource purchased by the tenant, where a function of the operation and maintenance notification includes one or more of the following: indicating a running status of the cloud resource purchased by the tenant, recommending a matching resource of the cloud resource purchased by the tenant, and reminding the tenant of fee information of the cloud resource purchased by the tenant.

Optionally, the sending module is further configured to send, to the tenant, one or more improvement policies used to improve the running status of the cloud resource purchased by the tenant, and the receiving module is further configured to receive a feedback instruction sent by the tenant, where the feedback instruction is used to indicate an improvement policy selected from the one or more improvement policies. Correspondingly, the cloud resource management apparatus further includes a processing module configured to execute, on the cloud resource purchased by the tenant, the improvement policy selected using the feedback instruction.

Optionally, the interaction interface includes one or more of the following: an API, an interaction template, and a configuration interface.

According to a fourth aspect, this disclosure provides a cloud resource management apparatus. The cloud resource management apparatus includes a sending module configured to send a cloud resource query instruction to a cloud management platform through an interaction interface in the cloud management platform, where the cloud resource query instruction is used to request to query a cloud resource managed by the cloud management platform, a receiving module configured to receive a cloud resource map that is sent by the cloud management platform and that is marked with a geographical location of the cloud resource, and a display module configured to display the cloud resource map.

Optionally, the cloud resource query instruction carries tenant information, and the cloud resource includes a cloud resource that has been purchased and/or concerned by a tenant corresponding to the tenant information.

Optionally, the cloud resource query instruction carries a cloud resource identifier, and the cloud resource includes a cloud resource indicated by the cloud resource identifier.

Optionally, the cloud resource query instruction carries a type identifier, and the cloud resource includes a cloud resource of a type indicated by the type identifier.

Optionally, the cloud resource map is further used to indicate related information of any cloud resource displayed in the cloud resource map, and the related information includes one or more of the following: a type of the cloud resource, a real-time running status of the cloud resource, a predicted running status of the cloud resource, a geographical location of a physical resource on which the cloud resource depends, an environment status of an environment in which the physical resource on which the cloud resource depends is located, a deployment condition of the cloud resource, fee information of the cloud resource, and version information of the cloud resource.

Optionally, the receiving module is further configured to receive a selection operation that is entered by a tenant and that is performed on any cloud resource in the cloud resource map, the sending module is further configured to send a selection instruction to the cloud management platform based on the selection operation, the receiving module is further configured to receive related information that is of the any cloud resource and that is sent by the cloud management platform, and the display module is further configured to display the related information of the any cloud resource, where the related information includes one or more of the following: a type of the cloud resource, a real-time running status of the cloud resource, a predicted running status of the cloud resource, a geographical location of a physical resource on which the cloud resource depends, an environment status of an environment in which the physical resource on which the cloud resource depends is located, a deployment condition of the cloud resource, fee information of the cloud resource, and version information of the cloud resource.

Optionally, the receiving module is further configured to receive an operation and maintenance notification that is of the cloud resource and that is sent by the cloud management platform, where a function of the operation and maintenance notification includes one or more of the following: indicating a running status of the cloud resource, recommending a matching resource of the cloud resource, and reminding the tenant of tariff information of the cloud resource, and the display module is further configured to display the operation and maintenance notification.

Optionally, the receiving module is further configured to receive one or more improvement policies that are sent by the cloud management platform and that are used to improve the running status of the cloud resource, the display module is further configured to display the one or more improvement policies, the receiving module is further configured to receive a feedback operation performed by the tenant on the one or more improvement policies, and the sending module is further configured to send a feedback instruction to the cloud management platform based on the feedback operation, where the feedback instruction is used to indicate an improvement policy selected from the one or more improvement policies.

According to a fifth aspect, this disclosure provides a computer device. The computer device includes a processor and a memory, the memory stores a computer program, and when the processor executes the computer program, the computer device implements the method according to the first aspect.

According to a sixth aspect, this disclosure provides a computer device. The computer device includes a processor and a memory, the memory stores a computer program, and when the processor executes the computer program, the computer device implements the method according to the second aspect.

According to a seventh aspect, this disclosure provides a storage medium. When instructions in the storage medium are executed by a processor, the method according to the first aspect is implemented.

According to an eighth aspect, this disclosure provides a storage medium. When instructions in the storage medium are executed by a processor, the method according to the second aspect is implemented.

DESCRIPTION OF EMBODIMENTS

To make objectives, technical solutions, and advantages of this disclosure clearer, the following further describes implementations of this disclosure in detail with reference to the accompanying drawings.

Embodiments of this disclosure provide a cloud resource management method. In the cloud resource management method, a terminal sends a cloud resource query instruction to a cloud management platform through an interaction interface of the cloud management platform, receives a cloud resource map that is sent by the cloud management platform and that is marked with a geographical location of a cloud resource, and displays the cloud resource map, such that the cloud resource map can be displayed on the terminal, and the geographical location of the cloud resource can be presented to a tenant, to enrich presentation manners of the cloud resource.

In addition, in the cloud resource management method, the cloud management platform provides an interaction interface, such that the cloud management platform can receive the cloud resource query instruction from the tenant through the interaction interface, and send, to the tenant according to the cloud resource query instruction, the cloud resource map marked with the geographical location of the cloud resource. This function of the cloud management platform enables a terminal used by the tenant to display the cloud resource map, and present the geographical location of the cloud resource to the tenant, to enrich functions of managing the cloud resource by the cloud management platform.

The geographical location of the cloud resource indicates a deployment location of a physical resource on which the cloud resource depends. The physical resource on which the cloud resource depends means that when the cloud resource is a physical resource, the cloud resource is the physical resource on which the cloud resource depends, or when the cloud resource is a virtual resource created based on a physical resource, the physical resource on which the cloud resource depends is the physical resource on which the virtual resource is created. For example, when the cloud resource is a bare metal server (BMS), the bare metal server is the physical resource on which the cloud resource depends. When the cloud resource is a virtual machine created based on a physical server, the physical server is a physical resource on which the virtual machine depends.

Figure 1:
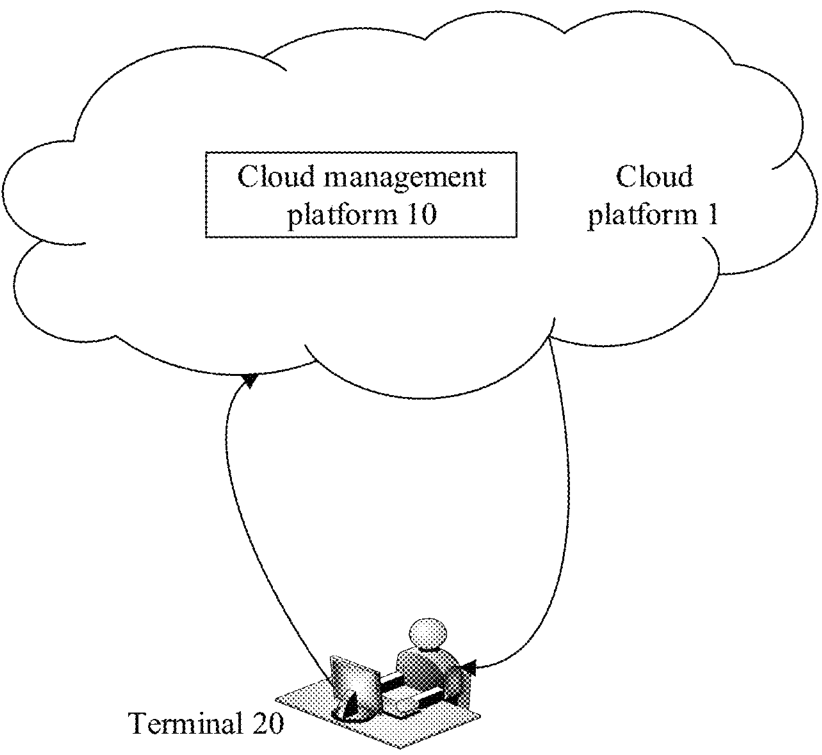
FIG. 1 is a schematic diagram of an implementation scenario used in a cloud resource management method according to an embodiment of this disclosure.

FIG. 1 is a schematic diagram of an implementation scenario used in a cloud resource management method according to an embodiment of this disclosure. As shown in FIG. 1, the implementation scenario includes a cloud management platform 10 and a terminal 20. The cloud management platform 10 can communicate with the terminal 20.

The cloud management platform 10 is deployed on a cloud platform 1. A large quantity of basic resources owned by a cloud service provider are deployed on the cloud platform 1. The base resource may be a computing resource, a storage resource, a network resource, or the like. In addition, the computing resource may be a large quantity of computing devices (for example, servers). The cloud platform 1 may implement a tenant service using the deployed basic resource, and provide a cloud service for a tenant. The tenant service includes a software application service created by the cloud platform 1 based on a service requirement of the tenant, and the like. For example, the tenant service includes a language recognition service, a video review service, an image rendering service, or the like that is created by the cloud platform 1 based on a service requirement of the tenant.

In addition, the cloud platform 1 may implement the tenant service based on the basic resource deployed on the cloud platform 1 or a resource virtualized based on the basic resource. This is not limited in this embodiment of this disclosure. In addition, in this embodiment of this disclosure, both the basic resource and the virtualized resource that are used to implement the tenant service are collectively referred to as a cloud resource. In addition, the cloud platform 1 may be a cloud platform 1 of a center cloud, a cloud platform 1 of an edge cloud, or a cloud platform 1 including a center cloud and an edge cloud. This is not limited in this embodiment of this disclosure.

The cloud management platform 10 may manage the cloud resource used to implement the tenant service. In addition, the tenant may access the cloud management platform 10 using the terminal 20, and perform related processing on the cloud resource using the cloud management platform 10. For example, the tenant may view related information of the cloud resource on the cloud management platform 10 using the terminal 20. For another example, the tenant may purchase the cloud resource on the cloud management platform 10 using the terminal 20. For another example, the tenant may renew the cloud resource on the cloud management platform 10 using the terminal 20. For another example, the tenant may view, on the cloud management platform 10 using the terminal 20, a running status of the cloud resource purchased by the tenant. For another example, the tenant may indicate, using the terminal 20, the cloud management platform 10 to perform an operation and maintenance operation such as upgrade on the cloud resource purchased by the tenant.

The cloud management platform 10 may be implemented using software or hardware. In a possible implementation, the cloud management platform 10 may be implemented using hardware such as a physical server. For example, the cloud management platform 10 may be implemented using a server, a server cluster including several servers, or a cloud computing service center. In another implementation, the cloud management platform 10 may be implemented using software deployed on the computing resource. The software is used to implement functions implemented by the cloud management platform 10 in the cloud resource management method provided in the embodiments of this disclosure. For example, the cloud management platform 10 may be implemented using a virtual machine or a container simulated using software on the basic resource. In addition, when the cloud management platform 10 is implemented using an independently deployed resource, or may be implemented using a resource deployed in a distributed manner. For example, software used to implement the cloud management platform 10 may be independently deployed on a server, a virtual machine, or a container on the cloud platform 1, or software used to implement the cloud management platform 10 may be deployed on a plurality of servers on the cloud platform 1 in a distributed manner, or software used to implement the cloud management platform 10 may be deployed on a plurality of virtual machines on the cloud platform 1 in a distributed manner, or software used to implement the cloud management platform 10 may be deployed on a plurality of containers on the cloud platform 1 in a distributed manner, or software used to implement the cloud management platform 10 may be deployed on a plurality of servers, a plurality of virtual machines, and a plurality of containers on the cloud platform 1 in a distributed manner.

The terminal 20 may be a desktop computer, a laptop computer, a mobile phone, a smartphone, a tablet computer, a multimedia player, a smart household appliance, an artificial intelligence device, an intelligent wearable device, an e-reader, an intelligent vehicle-mounted device, an internet of things device, or the like.

Figure 2:
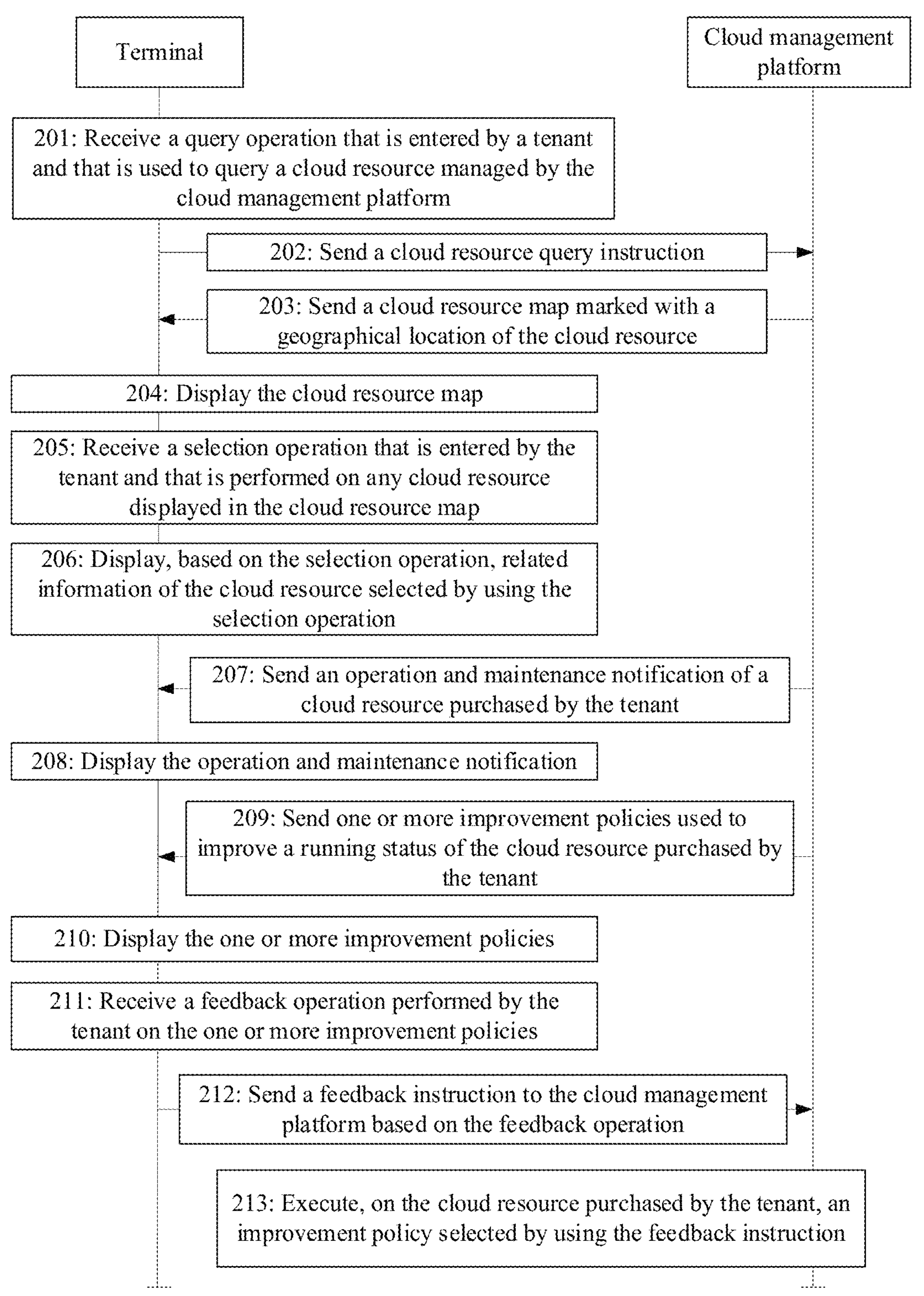
FIG. 2 is a flowchart of a cloud resource management method according to an embodiment of this disclosure.

The following describes, using an example in which the tenant sends a query instruction to the cloud management platform using the terminal, an implementation process of the cloud resource management method provided in this embodiment of this disclosure. As shown in FIG. 2, the implementation process of the cloud resource management method may include the following steps.

Step 201: A terminal receives a query operation that is entered by a tenant and that is used to query a cloud resource managed by a cloud management platform.

When the tenant has a requirement for querying the cloud resource managed by the cloud management platform, the tenant may perform, on a terminal used by the tenant, a query operation indicating to query the cloud resource, where the query operation triggers a query instruction in the terminal, and the terminal may send the query instruction to the cloud management platform, such that the cloud management platform sends, to the terminal, information about the cloud resource that the query operation indicates to query. The query instruction indicates to query the cloud resource managed by the cloud management platform.

In an implementation in which the tenant performs the query operation indicating to query the cloud resource, when the tenant has an intention to purchase the cloud resource, the tenant may perform, on the terminal used by the tenant, a query operation indicating to access the cloud management platform and query the cloud resource, such that the tenant determines, based on a query result of the cloud resource, a cloud resource that can implement a tenant service, and determines whether to purchase a corresponding cloud resource.

In another implementation in which the tenant performs the query operation indicating to query the cloud resource, after the tenant purchases the cloud resource, the tenant may perform, on the terminal used by the tenant, a query operation indicating to view the cloud resource purchased by the tenant, such that the tenant views information about the cloud resource purchased by the tenant, and the like.

In addition, when the tenant performs, on the terminal used by the tenant, an operation indicating to query the cloud resource, the tenant may indicate a cloud resource that needs to be queried, this means, the tenant may indicate to query some cloud resources managed by the cloud management platform. For example, the tenant may indicate to query a cloud resource that meets a specified attribute, or the tenant may indicate to query a specified cloud resource. The specified attribute may be determined based on an application requirement. For example, the cloud resource of the specified attribute may be a cloud resource of a specified type, or the cloud resource of the specified attribute may be a cloud resource that is deployed in a specified geographical region and that depends on a physical resource. Alternatively, the cloud resource of the specified attribute may be a cloud resource that has been purchased and/or concerned by the tenant. Alternatively, the tenant may query all cloud resources managed by the cloud management platform. For example, when performing a query operation on the terminal used by the tenant, the tenant may not specify a type of a cloud resource that needs to be queried. In this case, it may be considered by default that the tenant needs to query all cloud resources managed by the cloud management platform.

Step 202: The terminal sends a cloud resource query instruction to the cloud management platform based on the query operation through an interaction interface of the cloud management platform.

The query operation performed by the tenant triggers the cloud resource query instruction in the terminal, and the terminal may send the cloud resource query instruction to the cloud management platform, to request to query the cloud resource managed by the cloud management platform, this means, request the cloud management platform to send, to the terminal, information about the cloud resource that needs to be queried. For example, when the query operation indicates to query a plurality of cloud resources managed by the cloud management platform, the cloud resource query instruction is used to request the cloud management platform to send information about the plurality of cloud resources to the terminal. When the query operation indicates to query all cloud resources managed by the cloud management platform, the cloud resource query instruction is used to request the cloud management platform to send information about all the cloud resources to the terminal.

In addition, to help the cloud management platform determine a cloud resource that needs to be queried, the cloud resource query instruction may carry indication information used to indicate the cloud resource that needs to be queried. For example, the cloud resource query instruction may carry a type identifier, and the cloud resource query instruction carrying the type identifier indicates to query a cloud resource of a type indicated by the type identifier. Alternatively, the cloud resource query instruction may carry a cloud resource identifier, and the cloud resource query instruction carrying the cloud resource identifier indicates to query a cloud resource indicated by the cloud resource identifier. Alternatively, the cloud resource query instruction may carry tenant information, and the cloud resource query instruction carrying the tenant information indicates to query a cloud resource that has been purchased and/or concerned by a tenant corresponding to the tenant information. Alternatively, when performing, on the terminal used by the tenant, an operation indicating to query the cloud resource, the tenant may not specify a type of a cloud resource that needs to be queried. In this case, when the cloud resource query instruction carries indication information of the cloud resource that needs to be queried, it may be considered by default that the tenant needs to query all cloud resources managed by the cloud management platform.

The cloud management platform may provide an interaction interface, and the terminal used by the tenant can interact with the cloud management platform through the interaction interface. Therefore, the terminal may send information such as a query instruction to the cloud management platform through the interaction interface. Optionally, the interaction interface may include one or more of the following: an API, an interaction template, and a configuration interface. The interaction template is a template that is provided by the cloud management platform for the tenant and that is used to implement different functions. When the tenant needs to use a function, the tenant may download a template used to implement the function, add related information of the tenant to the template, and then feed back, to the cloud management platform, the template to which the related information of the tenant is added. After receiving the template to which the related information of the tenant is added, the cloud management platform may obtain a function that needs to be implemented by the template, and customize the function based on the information of the tenant. The configuration interface means that the tenant may perform an operation in the configuration interface, to indicate the function that needs to be implemented by the tenant.

Step 203: The cloud management platform sends, to the tenant according to the cloud resource query instruction, a cloud resource map marked with a geographical location of the cloud resource.

The cloud management platform may receive, through the interaction interface of the cloud management platform, the cloud resource query instruction sent by the terminal. In addition, after receiving the cloud resource query instruction, the cloud management platform may send the cloud resource map to the terminal according to the cloud resource query instruction, where the cloud resource map is marked with the geographical location of the cloud resource that needs to be queried by the tenant. In addition, in this embodiment of this disclosure, because the cloud resource map needs to be displayed in the terminal, when sending the cloud resource map to the terminal, the cloud management platform may further send a display manner of the cloud resource map to the terminal, such that the terminal displays information about the cloud resource to the tenant in the cloud resource map in the display manner. The display manner indicates at least a display location of the geographical location of the cloud resource in the cloud resource map, this means, the geographical location of the cloud resource is displayed at a deployment location of a physical resource on which the cloud resource depends. In other words, the cloud resource map indicates at least a deployment location of a physical resource on which each of cloud resources that need to be queried by the tenant depends, and a relative location relationship between display locations of deployment locations of any two physical resources in the cloud resource map is used to reflect a relative location relationship between the deployment locations of the any two physical resources.

Step 204: The terminal displays the cloud resource map.

After receiving the cloud resource map sent by the cloud management platform, the terminal may display the display cloud resource map. In addition, it can be learned from the descriptions of step 203 that the cloud resource map indicates at least the deployment location of the physical resource on which each of the cloud resources depends, and the relative location relationship between the display locations of the deployment locations of the any two physical resources in the cloud resource map is used to reflect the relative location relationship between the deployment locations of the any two physical resources.

In a possible implementation, the cloud resource map directly displayed by the terminal based on the cloud resource map may indicate only a deployment location of a physical resource on which the cloud resource depends. The cloud resource map directly displayed by the terminal based on the cloud resource map is a cloud resource map displayed after the terminal receives the cloud resource map and before the terminal receives another operation of the terminal.

Figure 3:
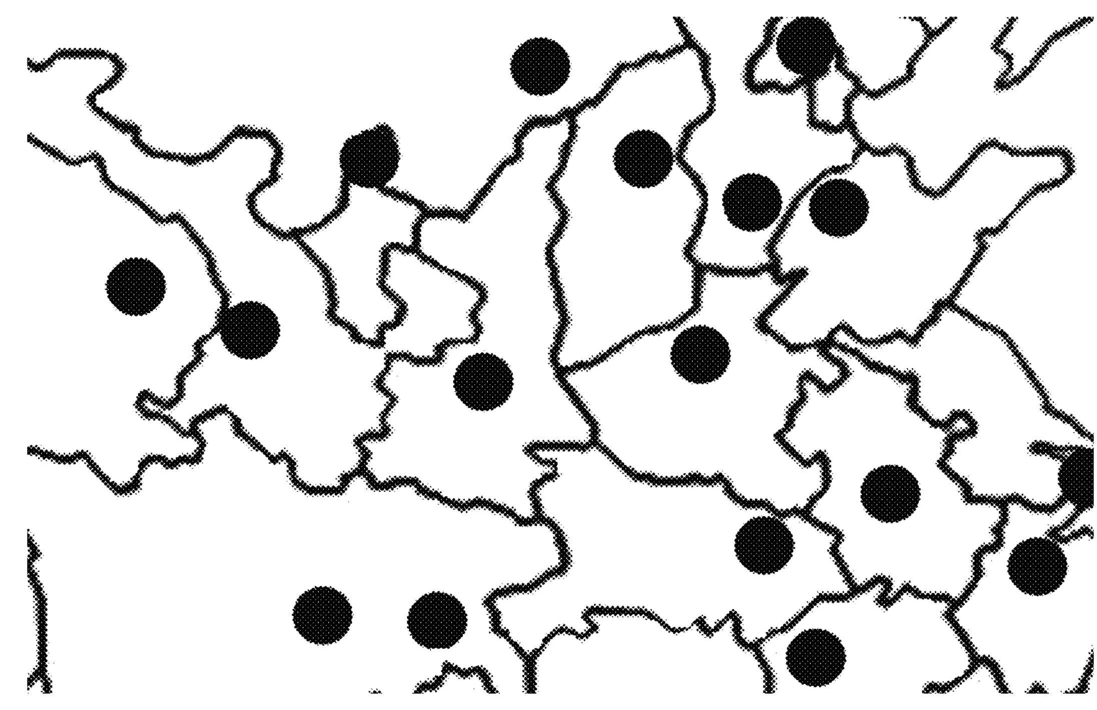
FIG. 3 is a schematic diagram of a cloud resource displayed by a terminal according to an embodiment of this disclosure.

Optionally, when displaying the cloud resource map, the terminal may display only an icon used to identify the cloud resource, and when displaying only the icon used to identify the cloud resource, may use a same icon to represent all types of cloud resources in the cloud resource map, or may use different icons to represent different types of cloud resources. For example, FIG. 3 to FIG. 6 are schematic diagrams of deployment of cloud resources in some regions of China. In addition, FIG. 3 to FIG. 6 are merely used to describe an example of an implementation process of the cloud resource management method provided in this disclosure, to facilitate understanding of the cloud resource management method provided in this disclosure, and are not used for another purpose. As shown in FIG. 3, all black dots in FIG. 3 are used to indicate that a cloud resource is deployed at a display location of the black dot, a deployment location of the cloud resource is a deployment location of a physical resource on which the cloud resource depends, and in FIG. 3, a same icon is used to represent all types of cloud resources in a cloud resource map.

In another possible implementation, the cloud resource map directly displayed by the terminal based on the cloud resource map is further used to indicate related information of any cloud resource displayed in the cloud resource map. Optionally, the related information includes one or more of the following: a type of the cloud resource, a real-time running status of the cloud resource, a predicted running status of the cloud resource, a geographical location of a physical resource on which the cloud resource depends, an environment status of an environment in which the physical resource on which the cloud resource depends is located, a deployment condition of the cloud resource, fee information of the cloud resource, and version information of the cloud resource.

The real-time running status of the cloud resource is a running status of the cloud resource at a current moment. The real-time running status may be represented by a processing rate of the cloud resource, network traffic flowing through the cloud resource, a storage status of the cloud resource, whether the cloud resource is in an online state, whether the cloud resource is in an arrears state, and the like. The predicted running status of the cloud resource is a running status of the cloud resource in specified duration after a current moment, and the specified duration may be determined based on an application requirement. In addition, the predicted running status may also be represented using a processing rate of the cloud resource, network traffic flowing through the cloud resource, a storage status of the cloud resource, whether the cloud resource is in an online state, whether the cloud resource is in an arrears state, and the like. In addition, the cloud management platform may predict the predicted running status of the cloud resource based on a part or all of the related information. Optionally, a prediction function of the cloud management platform may be implemented using an artificial intelligence (AI) technology. The geographical location of the physical resource on which the cloud resource depends indicates a deployment location of the physical resource. The geographical location may be represented in a plurality of manners. For example, the geographical location may be represented using longitude and latitude. Alternatively, the geographical location is represented using an address. The environment condition of the environment in which the physical resource on which the cloud resource depends is located may include a weather condition, for example, a temperature condition, a rainfall condition, and air humidity. The deployment condition of the cloud resource is a condition that affects deployment of the cloud resource and the physical resource on which the cloud resource depends. For example, when the physical resource on which the cloud resource depends includes direct connect, the deployment condition includes conditions such as a condition of a road to which direct connect is paved and a weather condition. For example, when the cloud resource is a virtual resource, the deployment condition includes a condition such as a running status of a physical server on which the virtual resource is created. The fee information of the cloud resource includes all fee information related to the cloud resource. For example, the fee information may include a tariff standard of the cloud resource. In addition, when the cloud resource is a purchased resource, the fee information may further include information such as a remaining fee of the cloud resource, whether the cloud resource needs to be renewed, a renewal manner, a renewal time limit, and a renewal tariff standard.

Figure 4:
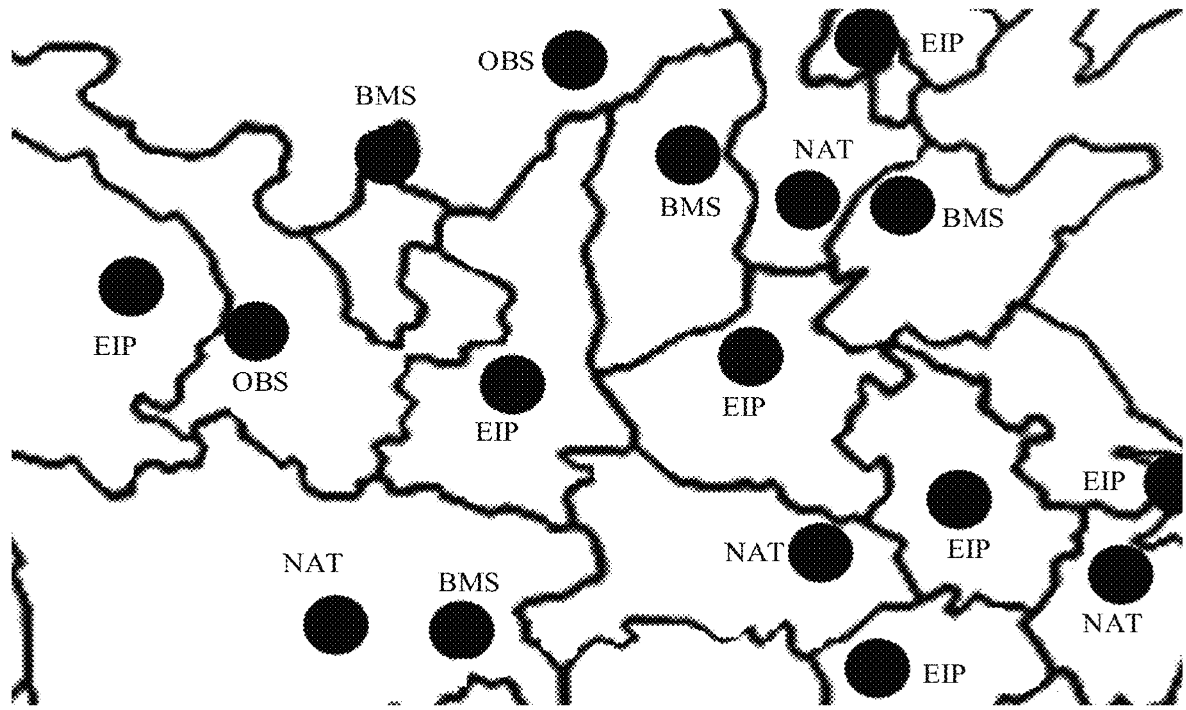
FIG. 4 is another schematic diagram of a cloud resource displayed by a terminal according to an embodiment of this disclosure.

For example, as shown in FIG. 4, all black dots in FIG. 4 indicate that a cloud resource is deployed at a display location of the black dot, a deployment location of the cloud resource is a deployment location of a physical resource on which the cloud resource depends, and a character around the black dot is used to identify a resource type of the cloud resource deployed at the display location of the black dot. For example, a resource type of a cloud resource deployed at a display location of a black dot is a BMS, a resource type of a cloud resource deployed at a display location of a black dot is an elastic cloud server (ECS), a resource type of a cloud resource deployed at a display location of a black dot is an elastic Internet Protocol (EIP) server, a resource type of a cloud resource deployed at a display location of a black dot is a network address translation (NAT) gateway, a resource type of a cloud resource deployed at a display location of a black dot is a virtual private cloud (VPC), and a resource type of a cloud resource deployed at a display location of a black dot is an object storage service (OBS) resource.

TABLE 1

| ECS | Geographical location | Real-time running status | Tenant | Associated resource | Others |
|---|---|---|---|---|---|
| 6f8c114b58f2ce9e | Longitude 120.12°<br>North latitude 30.16° | Normal | 00000001 | EIP whose identifier is 001<br>Bare metal server whose identifier is 002 | None |

For another example, as shown in Table 1, for an ECS whose identifier is 6f8c114b58f2ce9e, related information of the ECS may include a physical resource on which the ECS depends is located at longitude 120.12° north latitude 30.16°, a real-time running status of the ECS is normal, an identifier of a tenant of the ECS is 00000001, and the ECS is used together with the EIP whose identifier is 001 and the bare metal server whose identifier is 002. Therefore, the cloud resource map may further display the foregoing related information of the ECS.

It should be noted that, to ensure that the cloud resource map can indicate related information of the cloud resource, the cloud management platform further has a function of obtaining the related information of the cloud resource, and the cloud management platform can send the related information of the cloud resource to the terminal. Further, the cloud management platform can evaluate performance of the cloud resource based on a part or all of the related information of the cloud resource, and measure the performance of the cloud resource using a score. In addition, the cloud management platform may further send the score of the cloud resource to the terminal, and display the score of the cloud resource on the cloud resource map using the terminal, such that the tenant learns of the performance of the cloud resource based on the score.

Optionally, the terminal may display the score of the cloud resource in a plurality of implementations. In a possible implementation, the terminal may directly display the score at the deployment location of the physical resource on which the cloud resource depends in the cloud resource map. For example, when the score of the cloud resource is 78, the terminal may display 78 at the deployment location of the physical resource on which the cloud resource depends in the cloud resource map, to indicate that the score of the cloud resource is 78. In another possible implementation, the terminal may display different scores of the cloud resource using icons of different colors, such that the tenant can identify performance of the cloud resource based on the colors. For example, the terminal may use brown to indicate that the score of the cloud resource is within a range of [0,60], use red to indicate that the score of the cloud resource is within a range of (60, 70], use orange to indicate that the score of the cloud resource is within a range of (70, 80], use yellow to indicate that the score of the cloud resource is within a range of (80, 90], and use green to indicate that the score of the cloud resource is within a range of (90, 100].

In addition, when the terminal displays the cloud resource map, when the cloud resource displayed in the cloud resource map includes the cloud resource that has been purchased and/or concerned by the tenant, the terminal may further display, in the cloud resource map in a highlight manner, the cloud resource that has been purchased and/or concerned by the tenant. For example, the terminal distinguishes, using different colors, between the cloud resource that has been purchased by the tenant and a cloud resource that has not been purchased by the tenant. Alternatively, the terminal marks the cloud resource that has been purchased by the tenant (for example, marks the cloud resource using a circle or a text), to indicate that the marked resource is the cloud resource that has been purchased by the tenant.

Figure 5:
FIG. 5 is still another schematic diagram of a cloud resource displayed by a terminal according to an embodiment of this disclosure.
Figure 6:
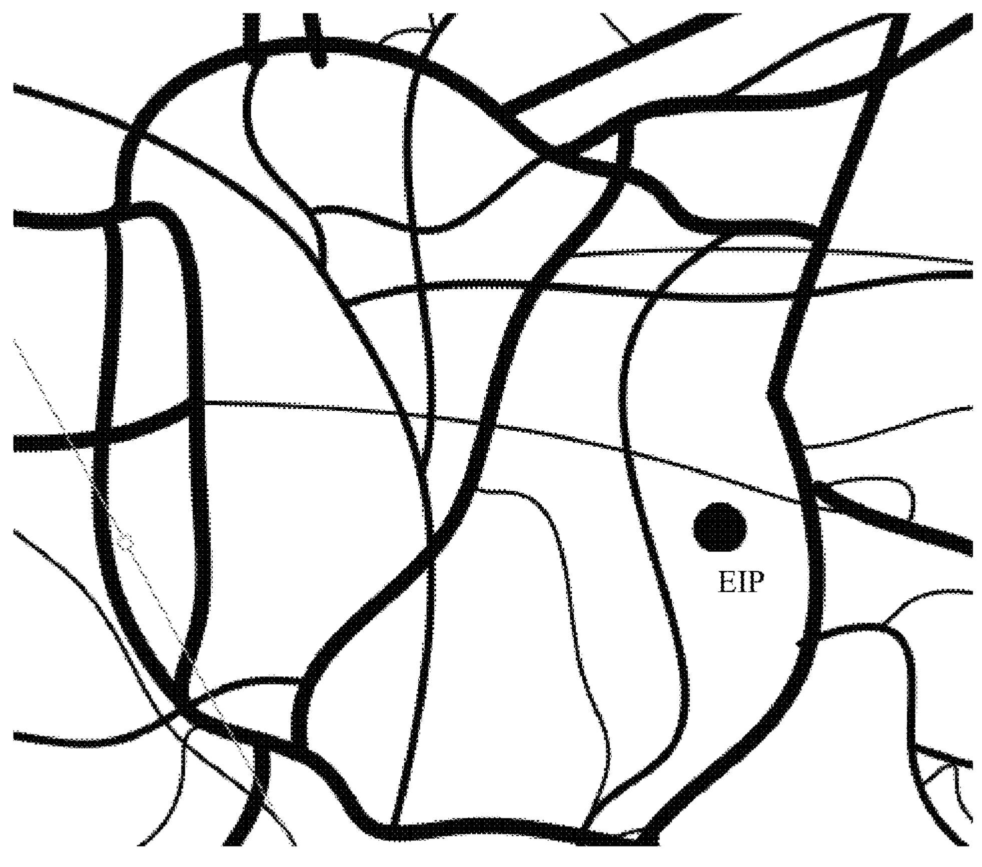
FIG. 6 is yet another schematic diagram of a cloud resource displayed by a terminal according to an embodiment of this disclosure.

In addition, when the cloud resource map is displayed in the terminal, the terminal may further display the cloud resource map in the terminal according to an indication of the tenant and based on different scaling times, such that the tenant learns of global information and detailed local information of the cloud resource map. For example, assuming that both FIG. 3 and FIG. 4 show cloud resource maps whose magnification times are 1 and that are displayed by the terminal, FIG. 5 may show a cloud resource map whose magnification times are 50 and that is displayed by the terminal, and FIG. 6 shows a cloud resource map whose magnification times are 60 and that is displayed by the terminal. As shown in FIG. 5, compared with FIG. 4, FIG. 5 displays EIP in FIG. 4, and FIG. 5 displays more detailed local information than that in FIG. 4. As shown in FIG. 6, compared with FIG. 5, FIG. 6 displays a partial enlarged diagram of a part including EIP in FIG. 5. It can be learned that FIG. 6 shows more detailed local information than that in FIG. 5.

Optionally, when the cloud resource map directly displayed by the terminal based on the cloud resource map indicates only the deployment location of the physical resource on which the cloud resource depends, after receiving a selection operation performed by the tenant on any cloud resource in the cloud resource map, the terminal may further display, based on the selection operation, related information of the cloud resource selected using the selection operation. In an implementation, as shown in FIG. 2, after the terminal directly displays the cloud resource map based on the cloud resource map, the cloud resource management method further includes the following steps.

Step 205: The terminal receives a selection operation that is entered by the tenant and that is performed on any cloud resource displayed in the cloud resource map.

When the tenant views the cloud resource map on the terminal, the tenant may select any cloud resource managed by the cloud management platform, to indicate that related information of the cloud resource needs to be learned of. The selection operation triggers the selection instruction in the terminal. In this case, the terminal may make a response according to the selection instruction. The selection instruction indicates to query the related information of the selected cloud resource.

The related information of the cloud resource queried using the selection operation may be determined based on an application requirement. In a possible implementation, the related information includes one or more of the following: a real-time running status of the cloud resource, a predicted running status of the cloud resource, a geographical location of a physical resource on which the cloud resource depends, an environment status of an environment in which the physical resource on which the cloud resource depends is located, a deployment condition of the cloud resource, fee information of the cloud resource, and version information of the cloud resource. In addition, a type of information included in the related information may be specified by the tenant. For example, the tenant can specify querying a real-time running status of a cloud resource managed by the cloud management platform.

Optionally, the selection operation may be performed by the tenant to trigger the selection operation in many implementations. For example, the selection operation may be searching a search box in an interface in which the cloud resource map is displayed for a cloud resource, or may be clicking a cloud resource using a mouse, or may be moving an input cursor to a display location of a cloud resource. This is not limited in this embodiment of this disclosure.

Step 206: The terminal displays, based on the selection operation, the related information of the cloud resource selected using the selection operation.

After receiving the selection operation entered by the tenant, the terminal may display, in the terminal, the related information of the cloud resource selected using the selection operation, such that the tenant learns of the related information of the cloud resource. In addition, a location of displaying the related information of the cloud resource in the terminal may be set based on an application requirement. This is not limited in this embodiment of this disclosure. For example, the related information of the cloud resource may be displayed at the display location of the physical resource on which the cloud resource depends in the cloud resource map. Alternatively, the related information of the cloud resource is displayed in an area in which no valid information is displayed in the cloud resource map. Alternatively, the related information of the cloud resource is displayed in a blank area in a terminal interface in which the cloud resource map is displayed.

Figure 7:
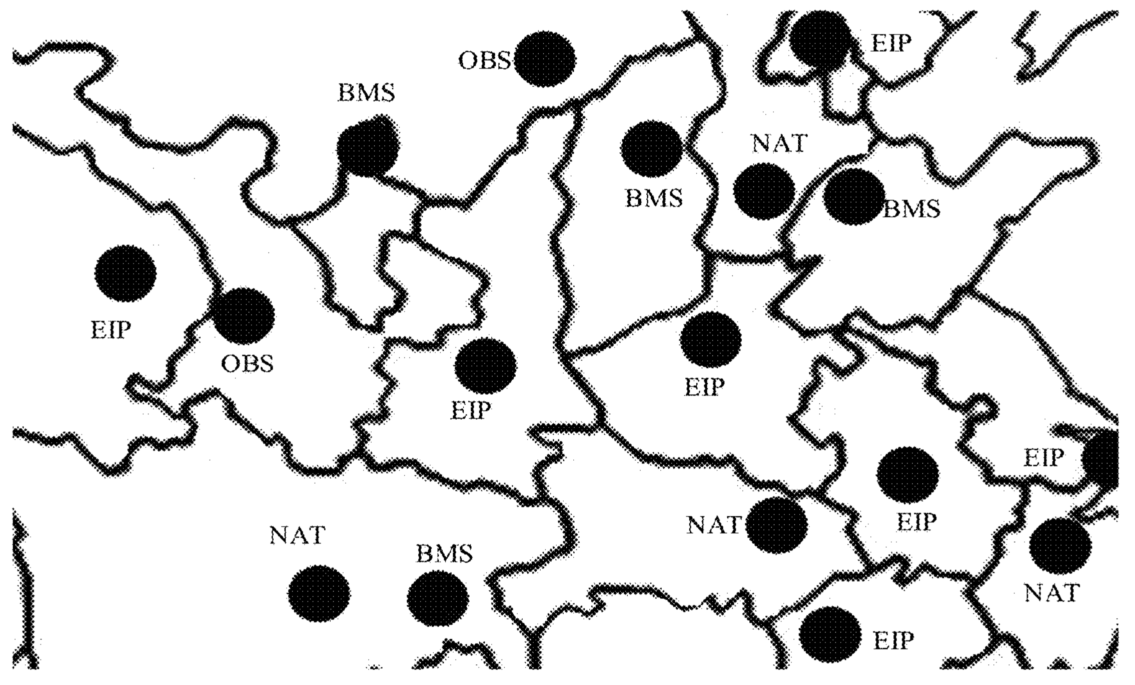
FIG. 7 is still yet another schematic diagram of a cloud resource displayed by a terminal according to an embodiment of this disclosure.

For example, as shown in FIG. 7, all black dots in FIG. 7 are used to indicate that a cloud resource is deployed at a display location of the black dot, and a deployment location of the cloud resource is a deployment location of a physical resource on which the cloud resource depends. Assuming that the related information of the cloud resource includes a geographical location of the physical resource on which the cloud resource depends, when the terminal receives a selection operation entered by the tenant, indicating to select a NAT gateway whose identifier is 111122223333, the terminal displays "located at No. 7 Huaying Road, Binjiang District, Hangzhou, China" at a display location of the NAT gateway whose identifier is 111122223333 in the cloud resource map.

It should be noted that before displaying the related information of the cloud resource based on the selection operation, the terminal needs to first obtain the related information of the cloud resource. In this embodiment of this disclosure, the terminal may obtain the related information of the cloud resource in a plurality of implementations. The following uses the two possible implementations as examples for description.

In a possible implementation of obtaining the related information of the cloud resource, when sending the cloud resource map to the terminal, the cloud management platform may further send, to the terminal, related information of all cloud resources included in the cloud resource map. After receiving the related information of all the cloud resources included in the cloud resource map, the terminal may first store the related information of all the cloud resources included in the cloud resource map, and after receiving a selection operation, in the related information of all the cloud resources included in the cloud resource map, the terminal queries related information of a cloud resource selected using the selection operation, and displays, in the terminal, the related information of the cloud resource selected using the selection operation.

Figure 8:
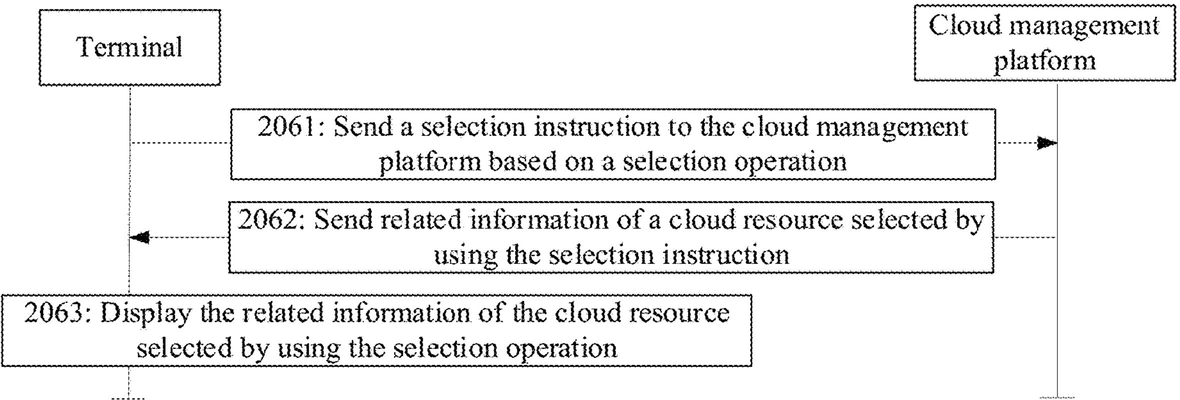
FIG. 8 is a flowchart of a method in which a terminal displays related information of any cloud resource according to a selection instruction according to an embodiment of this disclosure.

In another possible implementation of obtaining the related information of the cloud resource, after the terminal receives a selection operation, the terminal may request, from the cloud management platform, related information of a cloud resource selected using the selection operation, and after obtaining, from the cloud management platform, the related information of the cloud resource selected using the selection operation, the terminal displays, in the terminal, the related information of the cloud resource selected using the selection operation. As shown in FIG. 8, an implementation process includes the following steps.

Step 2061: The terminal sends a selection instruction to the cloud management platform based on a selection operation.

The selection instruction indicates to request to query related information of a cloud resource selected using the selection operation.

After the terminal receives the selection operation, the terminal may send the selection instruction to the cloud management platform, to request the cloud management platform to send, to the terminal, the related information of the cloud resource selected using the selection operation. In addition, to help the cloud management platform determine a cloud resource whose related information needs to be obtained, the selection instruction carries indication information of the cloud resource selected using the selection operation. For example, the selection instruction may carry an identifier of the cloud resource selected using the selection operation.

Step 2062: The cloud management platform sends, to the terminal, the related information of the cloud resource selected using the selection instruction.

After receiving the selection instruction sent by the terminal, the cloud management platform may obtain, according to the selection instruction, the related information of the cloud resource queried using the selection instruction, and send, to the terminal, the related information of the cloud resource selected using the selection instruction.

Step 2063: The terminal displays the related information of the cloud resource selected using the selection operation.

After receiving the related information that is of the cloud resource selected using the selection operation and that is sent by the cloud management platform, the terminal may display the related information of the cloud resource in the terminal. Optionally, when the related information of the cloud resource includes a running status (including a real-time running status and/or a predicted running status) of the cloud resource, the cloud management platform may further indicate the terminal to display different running statuses of the cloud resource using icons of different colors, such that the tenant can learn of the running status of the cloud resource in a timely manner based on a color displayed by the terminal. Alternatively, a display policy for different running statuses of the cloud resource may be pre-configured in the terminal. When obtaining a running status of the cloud resource, the terminal may display different running statuses differently according to the display policy, such that the tenant can learn of the running status of the cloud resource in a timely manner based on the running statuses displayed differently by the terminal.

In a possible implementation, because the cloud management platform is configured to manage the cloud resource for implementing a tenant service, the cloud management platform may further send an operation and maintenance notification of the cloud resource to a terminal associated with the tenant. In this case, as shown in FIG. 2, the cloud resource management method further includes the following steps.

Step 207: The cloud management platform sends, to the terminal, an operation and maintenance notification of a cloud resource purchased by the tenant.

The cloud management platform is configured to manage the cloud resource, that is, the cloud management platform may be responsible for all transactions that ensure normal running of the cloud resource. In a possible implementation, the cloud management platform may send an operation and maintenance notification to a terminal associated with the cloud resource, such that the tenant who purchases the cloud resource learns of an operation and maintenance status of the cloud resource. A function of the operation and maintenance notification includes one or more of the following: indicating a running status (including a real-time running status and/or a predicted running status) of the cloud resource, recommending a matching resource of the cloud resource, and reminding the tenant of tariff information of the cloud resource.

Optionally, an implementation scenario of indicating the running status of the cloud resource may include the following. After determining that the tenant purchases a cloud resource, the cloud management platform prompts a real-time running status of the cloud resource when detecting that the real-time running status of the cloud resource purchased by the tenant is poor, and/or prompts a predicted running status when predicting that the predicted running status of the cloud resource purchased by the tenant may be poor. An implementation scenario of recommending the matching resource of the cloud resource may include the following. After the cloud management platform determines that the tenant purchases a cloud resource, the cloud management platform recommends, to the tenant according to a resource policy of the cloud management platform, a resource that can be used in cooperation with the cloud resource that has been purchased by the tenant, to better implement a tenant service. An implementation scenario of reminding the tenant of the tariff information of the cloud resource may include the following. After determining that the tenant purchases a cloud resource, the cloud management platform reminds the tenant of remaining duration for which the cloud resource can be used, reminding the tenant to renew the cloud resource, and/or the like.

In a possible implementation, when the tenant purchases a cloud resource, the cloud resource management platform may indicate the tenant to specify a terminal used to send information to the tenant, where the terminal used to send information to the tenant is a terminal associated with the cloud resource. Alternatively, the terminal associated with the cloud resource may be a terminal used when the tenant purchases the cloud resource by default. Alternatively, the terminal associated with the cloud resource may be all terminals used when the tenant queries the cloud resource after the tenant purchases the cloud resource. Alternatively, the terminal associated with the cloud resource may be a terminal that is most frequently used in all terminals used when the tenant queries the cloud resource after the tenant purchases the cloud resource.

Step 208: After receiving the operation and maintenance notification sent by the cloud management platform, the terminal displays the operation and maintenance notification in the terminal.

After receiving the operation and maintenance notification sent by the cloud management platform, the terminal may display the operation and maintenance notification in the terminal, to notify the tenant of corresponding information. In addition, an implementation of displaying the operation and maintenance notification may include displaying the operation and maintenance notification in a Short Message Services (SMS) message manner, displaying the operation and maintenance notification in an application related to the cloud resource, and/or the like. This is not limited in this embodiment of this disclosure.

Optionally, in addition to sending the operation and maintenance notification to a terminal associated with the cloud resource, the cloud management platform may further send other information to the terminal associated with the cloud resource. In a possible implementation, the cloud management platform may further send an improvement policy to the terminal associated with the cloud resource, where the improvement policy is used to improve the running status of the cloud resource purchased by the tenant. In this case, as shown in FIG. 2, the cloud resource management method further includes the following steps.

Step 209: The cloud management platform sends, to the terminal, one or more improvement policies used to improve a running status of the cloud resource purchased by the tenant.

After the cloud management platform determines that the tenant purchases a cloud resource, the cloud management platform recommends an improvement policy to the tenant according to a resource policy of the cloud management platform, where the improvement policy is used to improve the running status of the cloud resource purchased by the tenant. Optionally, the improvement policy that is determined by the cloud management platform according to the resource policy of the cloud management platform and that needs to be sent to the terminal may be obtained using an artificial intelligence technology.

In a possible implementation, the improvement policy may include: a policy for indicating to adjust a bandwidth used by the cloud resource, a policy for indicating to migrate a virtual resource used by the tenant, a policy for indicating to switch a type of the cloud resource, a policy for indicating to restart, rebind, and re-establish a connection to the cloud resource, a policy for indicating to expand a capacity of a cloud disk of the cloud resource or newly add a cloud disk, a policy for prompting to update software of the cloud resource, and the like.

When a network latency of the cloud resource needs to be improved, the improvement policy may be the policy for indicating to adjust the bandwidth used by the cloud resource. When a probability that a fault such as a breakdown occurs on a virtual resource needs to be improved, the improvement policy may be the policy for indicating to migrate the virtual resource used by the tenant, and the virtual resource may include a virtual machine or a container. When access efficiency of the cloud resource needs to be improved, the improvement policy may be the policy for indicating to switch the type of the cloud resource. When a current fault of the cloud resource needs to be rectified or a poor real-time running status of the cloud resource needs to be improved, the improvement policy may be the policy for indicating to restart, rebind, and re-establish the connection to the cloud resource. When a capacity of a cloud disk used by the cloud resource is insufficient, the improvement policy may be the policy for indicating to expand the capacity of the cloud disk of the cloud resource or newly add the cloud disk.

In addition, when sending the improvement policy to the terminal, the cloud management platform may send one or more improvement policies to the terminal at a time. When sending one improvement policy to the terminal, the cloud management platform may indicate the tenant to choose whether to execute the improvement policy on the cloud resource purchased by the tenant. When sending a plurality of improvement policies to the terminal, the cloud management platform may indicate the tenant to select a more appropriate improvement policy from the plurality of improvement policies based on a requirement of the tenant.

Step 210: After receiving the one or more improvement policies that are sent by the cloud management platform and that are used to improve the running status of the cloud resource purchased by the tenant, the terminal displays the one or more improvement policies in the terminal.

After receiving the one or more improvement policies sent by the cloud management platform, the terminal may display the one or more improvement policies in the terminal, such that the tenant selects an improvement policy.

Step 211: The terminal receives a feedback operation performed by the tenant on the one or more improvement policies.

After the terminal displays the one or more improvement policies, the tenant may select the one or more improvement policies, where the selection operation is the feedback operation on the improvement policy. Correspondingly, the terminal may receive the feedback operation performed by the tenant.

Step 212: The terminal sends a feedback instruction to the cloud management platform based on the feedback operation.

After receiving the feedback operation performed by the tenant on the one or more improvement policies, the terminal may send the feedback instruction to the cloud management platform, where the feedback instruction indicates an improvement policy selected by the tenant from the one or more improvement policies.

Step 213: After receiving the feedback instruction, the cloud management platform executes, on the cloud resource purchased by the tenant, the improvement policy selected using the feedback instruction.

After the cloud management platform receives the feedback instruction, when the feedback instruction indicates to execute one of the one or more improvement policies on the cloud resource, the cloud management platform may execute, on the cloud resource, the improvement policy indicated by the feedback instruction, to optimize performance of a running status of the cloud resource.

It should be noted that, in addition to the foregoing described functions, functions of managing the cloud resource by the cloud resource management further include other functions. For example, the cloud management platform may manage the cloud resource based on information such as a running status of the cloud resource, an identifier of the cloud resource, a deployment location of a physical resource on which the cloud resource depends, and an identifier of the tenant. This is not limited in this embodiment of this disclosure. For example, as shown in Table 1, the cloud management platform may query the related information of the cloud resource based on the identifier of the cloud resource. For another example, as shown in Table 2, the cloud management platform may manage the cloud resource based on the identifier of the tenant, this means, the cloud management platform may obtain cloud resources used by each tenant. For example, in Table 2, a tenant whose identifier is 00000001 uses an ECS whose identifier is 6f8c114b58f2ce9e, EIP whose identifier is 6f8c114b58f2c12e, cloud connect (CC) whose identifier is 6f8c114b5, EIP whose identifier is 6f8c114eeeeeeeee, and a BMS whose identifier is 6f8c2738788yjyuii.

TABLE 2

| Tenant | ECS | EIP | CC | EIP | BMS |
|---|---|---|---|---|---|
| 00000001 | 6f8c114b58f2ce9e | 6f8c114b58f2c12e | 6f8c114b5 | 6f8c114eeeeeeeee | 6f8c2738788yjyuii |
| 00000002 | 6f8c174b58f2ce9f | 6f8c114b58f2c11e | 6666114b5 | 6f8c1qj4k4h55zh | 6f8cyu364785g4j71 |
| 00000003 | 6f8c664b58f2ce9g | 6f8c114b58f2c23e | 6f848h4b5 | 6f8c1hahs17asd89 | 6f8cj2736g1g1g286 |
| 00000004 | 6f8c214658f2ce9h | 6f8c114b58f2ce24 | 6f83564b5 | 6f8c1j3k27896898 | 6f8c11245h3y48j55 |
| 00000005 | 6f8c234b58f2ce9j | 6f8c114b58f2ce16 | 63g5114b5 | 6f8c1uh9a0s9d88f | 6f8c156242524545h |
| 00000006 | 6f8c224b58f2ce9k | 6f8c114b58f2ce16 | 6111114b5 | 6f8c1hj278s98912 | 6f8cj475829376987 |

In conclusion, in the cloud resource management method provided in this embodiment of this disclosure, the cloud management platform provides an interaction interface, such that the cloud management platform can receive the cloud resource query instruction from the tenant through the interaction interface, and send, to the tenant according to the cloud resource query instruction, the cloud resource map marked with the geographical location of the cloud resource. This function of the cloud management platform enables a terminal used by the tenant to display the cloud resource map, and present the geographical location of the cloud resource to the tenant, to enrich functions of managing the cloud resource by the cloud management platform. In addition, compared with a related technology of displaying a cloud resource using a list, in the cloud resource management method in this embodiment of this disclosure, operation complexity of viewing the cloud resource by the tenant is simplified, the cloud resource is effectively combined with the geographical location, a global resource can be presented to the tenant, and information about a plurality of dimensions of the cloud resource can be presented to the tenant, such that the tenant can quickly locate the cloud resource and make an operation and maintenance decision on the cloud resource.

It should be noted that a sequence of the steps of the cloud resource management method provided in this embodiment of this disclosure may be properly adjusted. For example, an execution sequence of step 201 to step 206 and an execution sequence of step 207 and step 208 may be adjusted based on an application requirement, and steps may be correspondingly added or deleted based on a situation. For example, whether to perform step 205 and step 206 may be selected based on an application requirement. Any variation method readily figured out by a person skilled in the art within the technical scope disclosed in this disclosure shall fall within the protection scope of this disclosure. Therefore, details are not described herein.

Figure 9:
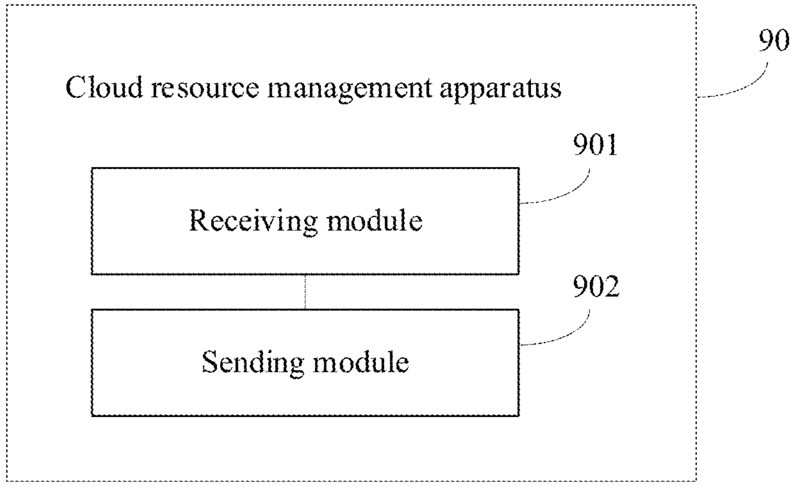
FIG. 9 is a schematic diagram of a structure of a cloud resource management apparatus according to an embodiment of this disclosure.

An embodiment of this disclosure further provides a cloud resource management apparatus. As shown in FIG. 9, the cloud resource management apparatus 90 includes a receiving module 901 configured to provide an interaction interface, where the interaction interface is used to receive a cloud resource query instruction from a tenant, and the cloud resource query instruction is used to request to query a cloud resource managed by the cloud resource management apparatus, and a sending module 902 configured to send, to the tenant according to the cloud resource query instruction, a cloud resource map marked with a geographical location of the cloud resource.

Optionally, the cloud resource query instruction carries tenant information, and the cloud resource includes a cloud resource that has been purchased and/or concerned by a tenant corresponding to the tenant information.

Optionally, the cloud resource query instruction carries a cloud resource identifier, and the cloud resource includes a cloud resource indicated by the cloud resource identifier.

Optionally, the cloud resource query instruction carries a type identifier, and the cloud resource includes a cloud resource of a type indicated by the type identifier.

Optionally, the cloud resource map is further used to indicate related information of any cloud resource displayed in the cloud resource map, and the related information includes one or more of the following: a type of the cloud resource, a real-time running status of the cloud resource, a predicted running status of the cloud resource, a geographical location of a physical resource on which the cloud resource depends, an environment status of an environment in which the physical resource on which the cloud resource depends is located, a deployment condition of the cloud resource, fee information of the cloud resource, and version information of the cloud resource.

Optionally, the interaction interface is further used to receive a selection instruction from the tenant, and the selection instruction is used to request to query a cloud resource selected using the selection instruction. In this case, the sending module 902 is further configured to send, to the tenant, related information of the cloud resource selected using the selection instruction, where the related information includes one or more of the following: a type of the cloud resource, a real-time running status of the cloud resource, a predicted running status of the cloud resource, a geographical location of a physical resource on which the cloud resource depends, an environment status of an environment in which the physical resource on which the cloud resource depends is located, a deployment condition of the cloud resource, fee information of the cloud resource, and version information of the cloud resource.

Optionally, the sending module 902 is further configured to send, to the tenant, an operation and maintenance notification of the cloud resource purchased by the tenant, where a function of the operation and maintenance notification includes one or more of the following: indicating a running status of the cloud resource purchased by the tenant, recommending a matching resource of the cloud resource purchased by the tenant, and reminding the tenant of fee information of the cloud resource purchased by the tenant.

Optionally, the sending module 902 is further configured to send, to the tenant, one or more improvement policies used to improve the running status of the cloud resources purchased by the tenant.

The receiving module 901 is further configured to receive a feedback instruction sent by the tenant, where the feedback instruction is used to indicate an improvement policy selected from the one or more improvement policies.

Figure 10:
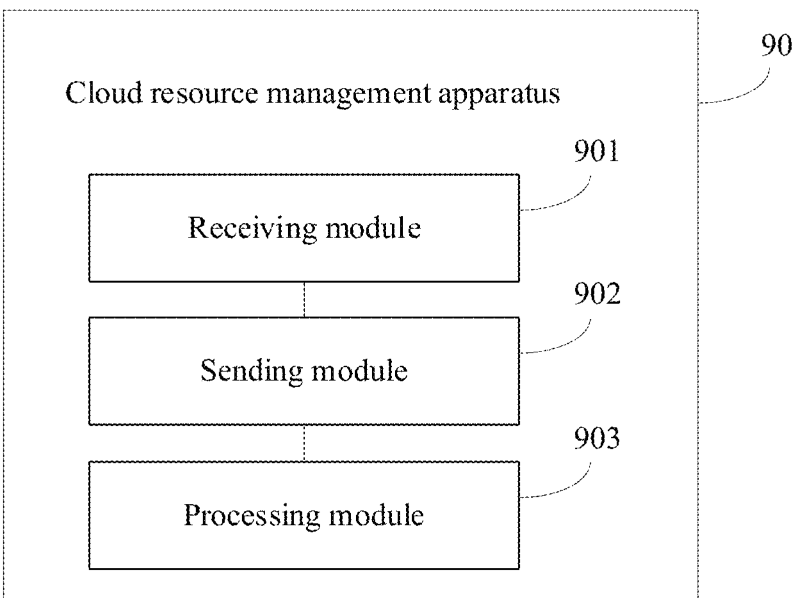
FIG. 10 is a schematic diagram of a structure of another cloud resource management apparatus according to an embodiment of this disclosure.

Correspondingly, as shown in FIG. 10, the cloud resource management apparatus 90 further includes a processing module 903 configured to execute, on the cloud resource purchased by the tenant, the improvement policy selected using the feedback instruction.

Optionally, the interaction interface includes one or more of the following: an API, an interaction template, and a configuration interface.

In conclusion, in the cloud resource management apparatus, the receiving module provides the interaction interface, and receives the cloud resource query instruction from the tenant through the interaction interface, and the sending module sends, to the tenant according to the cloud resource query instruction, the cloud resource map marked with the geographical location of the cloud resource. This function of the cloud resource management apparatus enables a terminal used by the tenant to display the cloud resource map, and present the geographical location of the cloud resource to the tenant, to enrich functions of managing the cloud resource by the cloud resource management apparatus.

Figure 11:
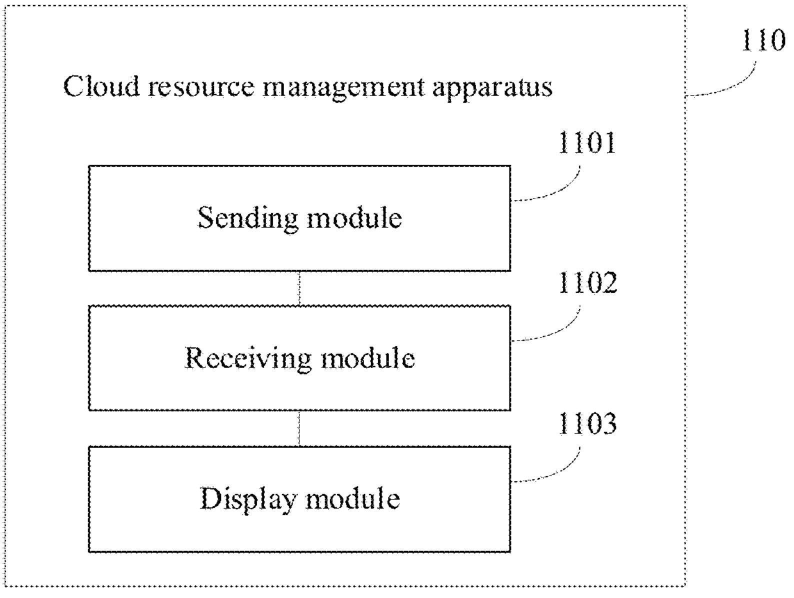
FIG. 11 is a schematic diagram of a structure of still another cloud resource management apparatus according to an embodiment of this disclosure.

An embodiment of this disclosure provides a cloud resource management apparatus. As shown in FIG. 11, the cloud resource management apparatus 110 includes a sending module 1101 configured to send a cloud resource query instruction to a cloud management platform through an interaction interface in the cloud management platform, where the cloud resource query instruction is used to request to query a cloud resource managed by the cloud management platform, and a receiving module 1102 configured to receive a cloud resource map that is sent by the cloud management platform and that is marked with a geographical location of the cloud resource, and a display module 1103 configured to display the cloud resource map.

Optionally, the cloud resource query instruction carries tenant information, and the cloud resource includes a cloud resource that has been purchased and/or concerned by a tenant corresponding to the tenant information.

Optionally, the cloud resource query instruction carries a cloud resource identifier, and the cloud resource includes a cloud resource indicated by the cloud resource identifier.

Optionally, the cloud resource query instruction carries a type identifier, and the cloud resource includes a cloud resource of a type indicated by the type identifier.

Optionally, the cloud resource map is further used to indicate related information of any cloud resource displayed in the cloud resource map, and the related information includes one or more of the following: a type of the cloud resource, a real-time running status of the cloud resource, a predicted running status of the cloud resource, a geographical location of a physical resource on which the cloud resource depends, an environment status of an environment in which the physical resource on which the cloud resource depends is located, a deployment condition of the cloud resource, fee information of the cloud resource, and version information of the cloud resource.

Optionally, the receiving module 1102 is further configured to receive a selection operation that is entered by a tenant and that is performed on any cloud resource in the cloud resource map.

The sending module 1101 is further configured to send a selection instruction to the cloud management platform based on the selection operation.

The receiving module 1102 is further configured to receive related information that is of the any cloud resource and that is sent by the cloud management platform.

The display module 1103 is further configured to display the related information of the any cloud resource, where the related information includes one or more of the following: a type of the cloud resource, a real-time running status of the cloud resource, a predicted running status of the cloud resource, a geographical location of a physical resource on which the cloud resource depends, an environment status of an environment in which the physical resource on which the cloud resource depends is located, a deployment condition of the cloud resource, fee information of the cloud resource, and version information of the cloud resource.

Optionally, the receiving module 1102 is further configured to receive an operation and maintenance notification that is of the cloud resource and that is sent by the cloud management platform, where a function of the operation and maintenance notification includes one or more of the following: indicating a running status of the cloud resource, recommending a matching resource of the cloud resource, and reminding the tenant of tariff information of the cloud resource.

The display module 1103 is further configured to display the operation and maintenance notification.

Optionally, the receiving module 1102 is further configured to receive one or more improvement policies that are sent by the cloud management platform and that are used to improve the running status of the cloud resource.

The display module 1103 is further configured to display the one or more improvement policies.

The receiving module 1102 is further configured to receive a feedback operation performed by the tenant on the one or more improvement policies.

The sending module 1101 is further configured to send a feedback instruction to the cloud management platform based on the feedback operation, where the feedback instruction is used to indicate an improvement policy selected from the one or more improvement policies.

In conclusion, in the cloud resource management apparatus, the sending module sends the cloud resource query instruction to the cloud management platform through the interaction interface in the cloud management platform, the receiving module receives the cloud resource map that is sent by the cloud management platform and that is marked with the geographical location of the cloud resource, and the display module displays the cloud resource map, such that the cloud resource map can be displayed on the cloud resource management apparatus, and the geographical location of the cloud resource can be presented to the tenant, to enrich presentation manners of the cloud resource.

It may be clearly understood by a person skilled in the art that, for the purpose of convenient and brief description, for a detailed working process of the foregoing apparatus and module, refer to the corresponding content in the foregoing method embodiments. Details are not described herein again.

An embodiment of this disclosure provides a computer device. The cloud resource management apparatus shown in FIG. 11 may be deployed in the computer device. The computer device may be a terminal. The terminal may be a desktop computer, a laptop computer, a mobile phone, a smartphone, a tablet computer, a multimedia player, a smart household appliance, an artificial intelligence device, an intelligent wearable device, an e-reader, an intelligent vehicle-mounted device, an internet of things device, or the like.

Figure 12:
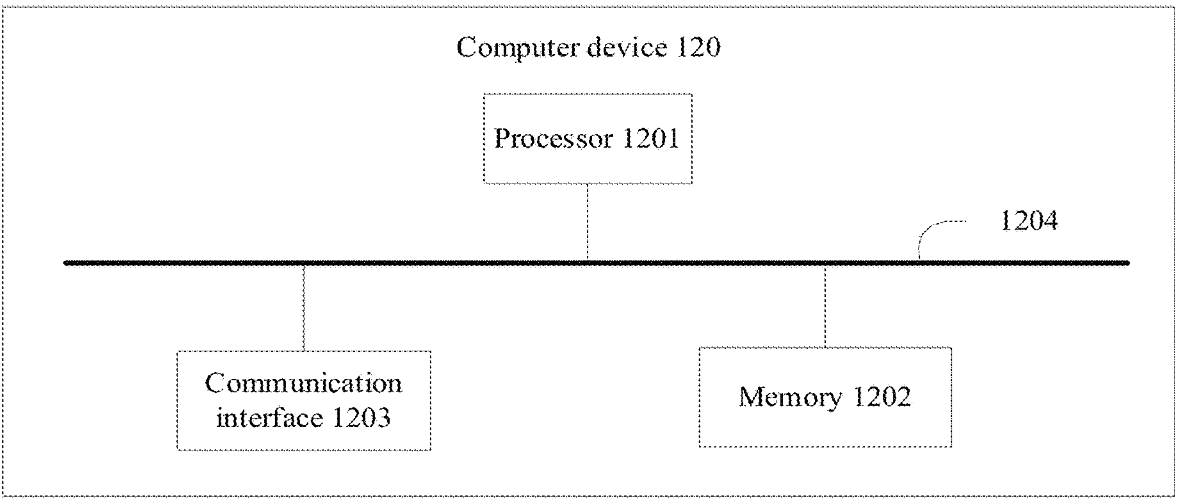
FIG. 12 is a schematic diagram of a structure of a computer device according to an embodiment of this disclosure.

FIG. 12 provides an example of a diagram of a possible architecture of a computer device. As shown in FIG. 12, the computer device 120 may include a processor 1201, a memory 1202, a communication interface 1203, and a bus 1204. In the computer device, there may be one or more processors 1201. FIG. 12 shows only one of the processors 1201. Optionally, the processor 1201 may be a central processing unit (CPU). When the computer device includes a plurality of processors 1201, the plurality of processors 1201 may be of a same type or different types. Optionally, the plurality of processors in the computer device may alternatively be integrated into a multi-core processor.

The memory 1202 stores computer instructions and data. The memory 1202 may store computer instructions and data that are required for implementing the cloud resource management method provided in this disclosure. The memory 1202 may be any one or any combination of the following storage media: a non-volatile memory (for example, a read-only memory (ROM), a solid-state drive (SSD), a hard disk drive (HDD), or an optical disc), and a volatile memory.

The communication interface 1203 may be any one or any combination of the following components with a network access function, such as a network interface (for example, an Ethernet interface) and a wireless network interface card. The communication interface 1203 is configured to perform data communication between the computer device and another node or another computer device.

FIG. 12 further draws an example of the bus 1204. The bus 1204 may connect the processor 1201 to the memory 1202 and the communication interface 1203. In this way, the processor 1201 may access the memory 1202 through the bus 1204, and may further exchange data with another node or another computer device through the communication interface 1203.

In this disclosure, the computer device executes the computer instructions in the memory 1202, to implement a function of the terminal in the cloud resource management method provided in this disclosure. For example, a cloud resource query instruction is sent to the cloud management platform through an interaction interface in the cloud management platform, where the cloud resource query instruction is used to request to query a cloud resource managed by the cloud management platform. A cloud resource map that is sent by the cloud management platform and that is marked with a geographical location of the cloud resource is received. The cloud resource map is displayed. In addition, for an implementation process in which the computer device performs the steps of the computer device by executing the computer instructions in the memory 1202, refer to corresponding descriptions in the foregoing method embodiments.

The cloud management platform provided in this embodiment of this disclosure may be independently deployed or distributedly deployed on a plurality of computers in a same environment or different environments. Therefore, this embodiment of this disclosure provides a computer device. The computing device may be a computer system, and the computer system includes one or more computers. The cloud resource management apparatus shown in FIG. 9 or FIG. 10 may be deployed in the computer device. The computer device may implement a function of the cloud management platform in this embodiment of this disclosure.

Figure 13:
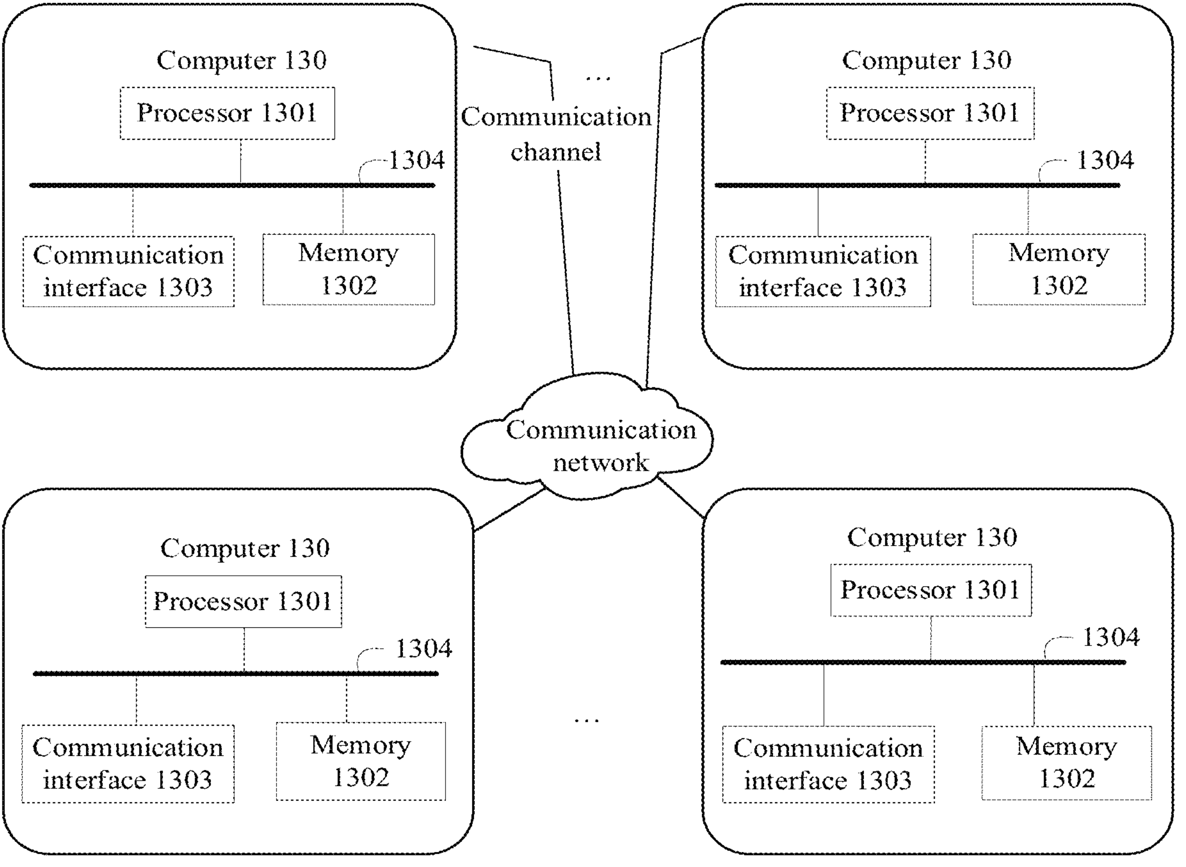
FIG. 13 is a schematic diagram of a structure of another computer device according to an embodiment of this disclosure.

In a possible implementation, when the cloud management platform is independently deployed on the computer device, for a schematic diagram of a structure of the computer device, correspondingly refer to the schematic diagram in FIG. 12. When the cloud management platform is distributedly deployed on a plurality of computers in a same environment or different environments, a schematic diagram of a structure of the computer device is shown in FIG. 13. Each computer 130 may include a processor 1301, a memory 1302, a communication interface 1303, and a bus 1304. The processor 1301, the memory 1302, and the communication interface 1303 are communicatively connected to each other through the bus 1304. FIG. 13 is a schematic diagram in which a computer device includes four computers.

In a computer, there may be one or more processors 1301. FIG. 13 is only a schematic diagram in which a computer includes one processor 1301. Optionally, the processor 1301 may be a CPU. When the computer device includes a plurality of processors 1301, the plurality of processors 1301 may be of a same type or different types. Optionally, the plurality of processors in the computer device may alternatively be integrated into a multi-core processor.

The memory 1302 stores computer instructions and data. The memory 1302 may store computer instructions and data that required for implementing the cloud resource management method provided in this disclosure. The memory 1302 may be any one or any combination of the following storage media: a non-volatile memory (for example, a ROM, an SSD, an HDD, or an optical disc), and a volatile memory.

The communication interface 1303 may be any one or any combination of the following components with a network access function, such as a network interface (for example, an Ethernet interface) and a wireless network interface card.

The communication interface 1303 is configured to perform data communication between the computer device and another node or another computer device.

FIG. 13 further draws an example of the bus 1304. The bus 1304 may connect the processor 1301 to the memory 1302 and the communication interface 1303. In this way, the processor 1301 may access the memory 1302 through the bus 1304, and may further exchange data with another node or another computer device through the communication interface 1303.

A communication channel is established between the computers 130 through a communication network. Each computer 130 is configured to implement some functions of the cloud management platform. Any computer 130 may be a computer (for example, a server) in a cloud data center, or a computer in an edge data center.

In this disclosure, the computer device executes the computer instructions in the memory 1302, to implement a function of the cloud management platform in the cloud resource management method provided in this disclosure. For example, an interaction interface is provided, where the interaction interface is used to receive a cloud resource query instruction from a tenant, and the cloud resource query instruction is used to request to query a cloud resource managed by the cloud management platform. A cloud resource map marked with a geographical location of the cloud resource is sent to the tenant according to the cloud resource query instruction. In addition, for an implementation process in which the computer device performs the steps of the computer device by executing the computer instructions in the memory 1302, refer to corresponding descriptions in the foregoing method embodiments.

An embodiment of this disclosure further provides a storage medium. The storage medium is a non-volatile computer-readable storage medium. When instructions in the storage medium are executed by a processor, a function of the cloud management platform in the cloud resource management method in embodiments of this disclosure is implemented.

An embodiment of this disclosure further provides a storage medium. The storage medium is a non-volatile computer-readable storage medium. When instructions in the storage medium are executed by a processor, a function of the terminal in the cloud resource management method in embodiments of this disclosure is implemented.

An embodiment of this disclosure further provides a computer program product including instructions. When the computer program product is run on a computer, the computer is enabled to perform a function of the cloud management platform in the cloud resource management method in embodiments of this disclosure.

An embodiment of this disclosure further provides a computer program product including instructions. When the computer program product is run on a computer, the computer is enabled to perform a function of the terminal in the cloud resource management method in embodiments of this disclosure.

A person of ordinary skill in the art may understand that all or some of the steps of the foregoing embodiments may be implemented by hardware or a program instructing related hardware. The program may be stored in a computer-readable storage medium. The storage medium may be a read-only memory, a magnetic disk, an optical disc, or the like.

In embodiments of this disclosure, the terms "first", "second", and "third" are merely used for description, but cannot be understood as an indication or implication of relative importance. The term "at least one" means one or more, and the term "a plurality of" means two or more, unless otherwise expressly limited.

The term "and/or" in this disclosure describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

The foregoing descriptions are merely optional embodiments of this disclosure, but are not intended to limit this disclosure. Any modification, equivalent replacement, or improvement made without departing from the concept and principle of this disclosure should fall within the protection scope of this disclosure.

What is claimed is:

1. A method implemented by a cloud management platform, wherein the method comprises:

providing an interaction interface;

receiving, on the interaction interface from a first tenant, a cloud resource query instruction requesting to query a first cloud resource managed by the cloud management platform;

sending, to the first tenant according to the cloud resource query instruction, a cloud resource map marked with a first geographical location of the first cloud resource;

sending, to the first tenant, one or more improvement policies for improving a running status of a second cloud resource purchased by a second tenant;

receiving, from the first tenant, a feedback instruction indicating an improvement policy selected from the one or more improvement policies; and executing, on the second cloud resource, the improvement policy.

2. The method of claim 1, wherein the cloud resource query instruction carries tenant information, and wherein the first cloud resource comprises the second cloud resource that has been purchased by the second tenant corresponding to the tenant information.

3. The method of claim 1, wherein the cloud resource query instruction carries tenant information, and wherein the first cloud resource comprises the second cloud resource that has been concerned by the second tenant corresponding to the tenant information.

4. The method of claim 1, wherein the cloud resource query instruction carries a cloud resource identifier, and wherein the first cloud resource comprises the second cloud resource indicated by the cloud resource identifier.

5. The method of claim 1, wherein the cloud resource query instruction carries a type identifier, and wherein the first cloud resource comprises the second cloud resource of a type indicated by the type identifier.

6. The method of claim 1, wherein the cloud resource map indicates related information of any cloud resource displayed in the cloud resource map, and wherein the related information comprises one or more of:

a type of the first cloud resource;

a real-time running status of the first cloud resource;

a predicted running status of the first cloud resource; or a second geographical location of a physical resource on which the first cloud resource depends.

7. The method of claim 1, further comprising:
receiving, on the interaction interface from the first tenant, a selection instruction requesting to query the second cloud resource selected using the selection instruction; and
sending, to the first tenant, related information of the second cloud resource after sending the cloud resource map, wherein the related information comprises one or more of:
an environment status of an environment in which the physical resource is located;
a deployment condition of the second cloud resource;
fee information of the second cloud resource; or
version information of the second cloud resource.

8. The method of claim 1, further comprising:
sending, to the first tenant, an operation and maintenance notification of the second cloud resource purchased by the second tenant, wherein a function of the operation and maintenance notification comprises one or more of:
indicating the running status of the second cloud resource;
recommending a matching resource of the second cloud resource; or
reminding the first tenant of fee information of the second cloud resource.

9. The method of claim 1, wherein the improvement policy comprises one or more of:
a first policy for indicating to adjust a bandwidth used by the second cloud resource;
a second policy for indicating to migrate a virtual resource used by the first tenant;
a third policy for indicating to switch a type of the second cloud resource;
a fourth policy for indicating to restart, rebind, and re-establish a connection to the second cloud resource;
a fifth policy for indicating to expand a capacity of a cloud disk of the second cloud resource;
a sixth policy for indicating to expand a capacity of a newly add cloud disk; or
a seventh policy for prompting to update software of the second cloud resource.

10. The method of claim 1, wherein the interaction interface comprises one or more of an application programming interface (API), an interaction template, or a configuration interface.

11. An apparatus comprising:
a memory configured to store instructions; and
one or more processors coupled to the memory and configured to execute the instructions to cause the apparatus to:
provide an interaction interface;
receive, on the interaction interface from a first tenant, a cloud resource query instruction requesting to query a first cloud resource managed by a cloud management platform;
send, to the first tenant according to the cloud resource query instruction, a cloud resource map marked with a first geographical location of the first cloud resource;
send, to the first tenant, one or more improvement policies for improving a running status of a second cloud resource purchased by a second tenant;
receive, from the first tenant, a feedback instruction indicating an improvement policy selected from the one or more improvement policies; and
execute, on the second cloud resource, the improvement policy.

12. The apparatus of claim 11, wherein the cloud resource query instruction carries tenant information, and wherein the first cloud resource comprises the second cloud resource that has been purchased by the second tenant corresponding to the tenant information.

13. The apparatus of claim 11, wherein the cloud resource query instruction carries tenant information, and wherein the first cloud resource comprises the second cloud resource that has been concerned by the second tenant corresponding to the tenant information.

14. The apparatus of claim 11, wherein the cloud resource query instruction carries a cloud resource identifier, and wherein the first cloud resource comprises the second cloud resource indicated by the cloud resource identifier.

15. The apparatus of claim 11, wherein the cloud resource query instruction carries a type identifier, and wherein the first cloud resource comprises the second cloud resource of a type indicated by the type identifier.

16. The apparatus of claim 11, wherein the cloud resource map indicates related information of any cloud resource displayed in the cloud resource map, and wherein the related information comprises one or more of:
a type of the first cloud resource;
a real-time running status of the first cloud resource;
a predicted running status of the first cloud resource; or
a second geographical location of a physical resource on which the first cloud resource depends.

17. The apparatus of claim 11, wherein the one or more processors are further configured to execute the instructions to cause the apparatus to:
receive, on the interaction interface from the first tenant, a selection instruction requesting to query the second cloud resource selected using the selection instruction; and
send, to the first tenant, related information of the second cloud resource, wherein the related information comprises one or more of:
an environment status of an environment in which the physical resource is located;
a deployment condition of the second cloud resource;
fee information of the second cloud resource; or
version information of the second cloud resource.

18. The apparatus of claim 11, wherein the one or more processors are further configured to execute the instructions to cause the apparatus to:
send, to the first tenant, an operation and maintenance notification of the second cloud resource purchased by the second tenant, wherein a function of the operation and maintenance notification comprises one or more of:
indicating the running status of the second cloud resource;
recommending a matching resource of the second cloud resource; and
reminding the first tenant of fee information of the second cloud resource.

19. The apparatus of claim 11, wherein the interaction interface comprises one or more of an application programming interface (API), an interaction template, or a configuration interface.

20. A computer program product comprising computer executable instructions stored on a non-transitory computer-readable storage medium and that, when executed by one or more processors, cause a network device to:

provide an interaction interface;

receive, on the interaction interface from a first tenant, a cloud resource query instruction requesting to query a first cloud resource managed by a cloud management platform;

send, to the first tenant according to the cloud resource query instruction, a cloud resource map marked with a first geographical location of the first cloud resource;

send, to the first tenant, one or more improvement policies for improving a running status of a second cloud resource purchased by a second tenant;

receive, from the first tenant, a feedback instruction indicating an improvement policy selected from the one or more improvement policies; and execute, on the second cloud resource, the improvement policy.

* * * * *